US009211807B2

(12) United States Patent
Okada et al.

(10) Patent No.: US 9,211,807 B2
(45) Date of Patent: Dec. 15, 2015

(54) CONTROL APPARATUS AND CONTROL METHOD FOR ELECTRICALLY DRIVEN VEHICLE

(75) Inventors: Koichi Okada, Iwata (JP); Yusuke Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 13/489,022

(22) Filed: Jun. 5, 2012

(65) Prior Publication Data
US 2012/0245776 A1  Sep. 27, 2012

Related U.S. Application Data

(63) Continuation of application No. PCT/JP2010/071822, filed on Dec. 6, 2010.

(30) Foreign Application Priority Data

Dec. 11, 2009  (JP) .................................. 2009-281210

(51) Int. Cl.
*B60L 15/20* (2006.01)
*B60K 7/00* (2006.01)
(Continued)

(52) U.S. Cl.
CPC . *B60L 15/20* (2013.01); *B60K 7/00* (2013.01); *B60K 7/0007* (2013.01); *B60W 10/08* (2013.01);
(Continued)

(58) Field of Classification Search
CPC .......... B60K 7/00; B60K 7/0007; B60K 1/02; B60K 2007/0038; B60L 15/20; B60L 2220/44; B60L 2240/423; B60L 2240/24; B60W 10/08; B60W 30/18145; B60W 2510/083; Y02T 10/648; Y02T 10/646; B60T 2240/07
USPC .................. 701/69–75, 82–85, 87–90, 22
See application file for complete search history.

(56) References Cited

U.S. PATENT DOCUMENTS 5,345,155 A *  9/1994  Masaki et al. ........... 318/400.07
2001/0054310 A1 * 12/2001  Dieckmann et al. ............ 73/146
(Continued)

FOREIGN PATENT DOCUMENTS

CN  1475390 A  2/2004
JP  62-89403   4/1987
(Continued)

OTHER PUBLICATIONS

English Translation of the International Preliminary Report on Patentability mailed Jul. 19, 2012 issued in corresponding International Patent Application No. PCT/JP2010/071822.
(Continued)

*Primary Examiner* — John Q Nguyen
*Assistant Examiner* — Jordan S Fei

(57) ABSTRACT

Even when the effective radii of wheels differ from each other because of a change in tire pneumatic pressure, the difference in driving force between left and right drive wheels are substantially zeroed to suppress a turning force to thereby increase the traveling stability. The use is made of a corrector for correcting a command value to be outputted to a drive circuit for an electric drive motor for each of the drive wheels. This corrector receives the steering angle, the respective numbers of revolutions of the drive wheels and an electric drive motor current and corrects with the use of the steering angle as measured with respect to a traveling direction so that command values relative to the drive wheels may have such a relation that the turning force induced in a vehicle as a result of the difference in effective radius between the drive wheels can be suppressed.

7 Claims, 2 Drawing Sheets

(51) Int. Cl.
  *B60W 10/08* (2006.01)
  *B60W 30/18* (2012.01)
  *B60K 1/02* (2006.01)

(52) U.S. Cl.
  CPC ............ *B60W 30/18145* (2013.01); *B60K 1/02* (2013.01); *B60K 2007/0038* (2013.01); *B60L 2220/44* (2013.01); *B60L 2240/24* (2013.01); *B60L 2240/423* (2013.01); *B60T 2240/07* (2013.01); *B60W 2510/083* (2013.01); *Y02T 10/646* (2013.01); *Y02T 10/648* (2013.01); *Y02T 10/7275* (2013.01)

(56) References Cited

U.S. PATENT DOCUMENTS

2010/0070142 A1* 3/2010 Patil ................................ 701/48
2010/0114428 A1* 5/2010 Kurata et al. ................... 701/36

FOREIGN PATENT DOCUMENTS

| JP | 5-176418 | 7/1993 |
|----|----------|--------|
| JP | 6-62509 | 3/1994 |
| JP | 9-322320 | 12/1997 |
| JP | 11-262112 | 9/1999 |
| JP | 2005-184978 | 7/2005 |
| JP | 2006-240402 | 9/2006 |
| JP | 2009-77505 | 4/2009 |

OTHER PUBLICATIONS

International Search Report for PCT/JP2010/071822 mailed Mar. 1, 2011.

Chinese Office Action mailed Mar. 5, 2014 in corresponding Chinese Application No. 201080055741.X.

Japanese Office Action issued Oct. 1, 2013 in corresponding Japanese Patent Application No. 2009-281210.

Japanese Office Action mailed Feb. 4, 2014 in corresponding Japanese Application No. 2009-281210.

Chinese Office Action dated Oct. 10, 2014 in corresponding Chinese Patent Application No. 201080055741.X.

Japanese Notice of Reasons for Rejection issued Feb. 3, 2015 in corresponding Japanese Patent Application No. 2014-104868.

* cited by examiner

CONTROL APPARATUS AND CONTROL METHOD FOR ELECTRICALLY DRIVEN VEHICLE

CROSS REFERENCE TO THE RELATED APPLICATION

This application is a continuation application, under 35 U.S.C. §111(a), of international application No. PCT/JP2010/071822, filed Dec. 6, 2010, which claims priority to Japanese patent application No. 2009-281210, filed Dec. 11, 2009, the entire disclosure of which is herein incorporated by reference as a part of this application.

BACKGROUND OF THE INVENTION

1. Field of the Invention

The present invention relates to the control of an electrically driven vehicle such as, for example, an automotive vehicle of a kind having left and right, independent drive motors.

2. Description of Related Art

The electric motorcar now attracting public attentions is considered a high performance vehicle as it makes use of left and right electric motors such as, for example, in-wheel motors that can be controlled independently from each other. In most of the electric motorcars currently available in the market, the electric motors employed are driven according to either a torque control scheme, that is, a scheme in which the electric current to be supplied to each of the electric motors is controlled, or of a scheme in which the number of revolutions of each of the electric motors is controlled. In those known control schemes, the drive wheels themselves tend to generate a turning force or a slewing force in the event that because of, for example, a change in tire pneumatic pressure, the effective radius differs between those drive wheels. The patent document 1 listed below addresses correction of a difference in driving force brought about by the difference in tire diameters and discloses a control method utilizing threshold values to refrain from exceeding the limit. In this control method, the difference in driving forces is to a certain extent permissible.

[Patent Document 1] JP Laid-open Patent Publication No. 2006-240402

SUMMARY OF THE INVENTION

The correction of the difference in driving force resulting from the difference of the tire diameters, which is disclosed in the patent document 1 listed above, is a control method in which the threshold values are utilized to avoid a possible surpass over the limits and, therefore, the difference in driving forces is permitted to a certain extent. For this reason, an improvement in vehicle traveling stability is insufficient.

In view of the foregoing, an object of the present invention is to provide a control device for an electrically powered vehicle of a type, in which even when the effective radii differ between left and right vehicle wheels because of a change in, for example, a tire pneumatic pressure in one or both of the vehicle wheels, the difference in driving forces between the left and right vehicle drive wheels can be zeroed to suppress generation of the turning force to thereby improve the vehicle traveling stability, and, also, to provide a method of so controlling in the electrically powered vehicle.

The present invention in accordance with one aspect thereof provides a control device for an electrically powered vehicle including a plurality of drive wheels capable of respectively performing left and right drives, which are independent from each other, and electric drive motors for driving those drive wheels, that is, a control device for an electrically powered vehicle of a type employing a plurality of drive wheels, drives of those wheels being performed separately and independently from each other, and electric drive motors for driving left and right drive wheels, respectively, separately and independently from each other. In accordance with the present invention, the control device for the electrically powered vehicle referred to above includes a steering angle detector for detecting the steering angle, which is the angle of turn of a steering wheel; a rotational number detector for detecting the number of revolutions per unitary time of each of the drive wheels; an electric drive motor current detector for detecting an electric drive motor current, which is a drive current applied to an electric drive motor for each of the drive wheels; a drive command output section capable of outputting a command value in accordance with an amount of actuation of an accelerator pedal; and a correcting section for correcting the command value of an electric current value or the number of revolutions that is inputted from the drive command output section so that the corrected command value is outputted to the drive circuit for the electric drive motor for each of the drive wheels.

The correcting section referred to above is inputted with the steering angle detected by the steering angle detector, the number of revolutions of each of the drive wheels detected by the rotational number detector and the electric drive motor current detected by the electric drive motor current detector and makes use of the steering angle as measured with respect to a traveling direction and is operable to correct the command value in accordance with a rule stipulated so that the relation between the corrected command values to be outputted to the respective drive circuits for the left and right drive wheels is such that rather than the relation between the command values before being corrected, a turning force induced in the electrically powered vehicle because of the difference in effective radius of the drive wheels can be suppressed.

According to the above mentioned aspect of the present invention, the correcting section referred to above makes use of the steering angle as measured with respect to a traveling direction and is operable to correct the command value of the electric current or the number of revolutions in accordance with a rule stipulated so that the relation between the corrected command values to be outputted to the respective drive circuits for the left and right drive wheels is such that rather than the relation between the command values before being corrected, a turning force induced in the electrically powered vehicle because of the difference in effective radius of the drive wheels can be suppressed. Since using the steering angle as measured with respect to the traveling direction the respective electric current values applied to or the respective numbers of revolutions of the left and right drive wheels are corrected, it is possible to suppress a generation of the turning force with the difference in driving force between the left and right drive wheels set to substantially zero, thereby increasing the traveling stability.

The rule stipulated for the correcting section depends on whether the drive command output section is capable of performing the torque control or whether the drive command output section is capable of performing the rotational number control.

Where the drive command output section is capable of performing the torque control of the electric drive motor referred to above, the stipulated rule followed by the correcting section may have a content which is such that the command value to be outputted to the drive circuit of each of the electric drive motors for the left and right drive wheels is corrected to establish the following equation when the steering angle detected by the steering angle detector is zero:

(Number of Revolutions of Left Drive Wheel)×(Drive Current of Left Drive Wheel)=(Number of Revolutions of Right Drive Wheel)×(Drive Current of Right Drive Wheel)

It is to be noted that the wording "the steering angle is zero" is to be construed as encompassing a range in which steering can be regarded as indicative of a straight forward travel.

Where the same torque is applied to the left and right electric drive motors, one of the wheels having a relatively small effective radius than the other tends to give rise to a large driving force, which in turn leads to a generation of the turning force. In the wheel having a small effective radius, the number of wheel revolutions tends to become high even during the straight forward travel of the electrically powered vehicle as compared with a wheel having a normal size. For this reason, in the event that the difference in number of revolutions occurs between the left and right wheels when the electrically powered vehicle is driven straight forwards with no steering wheel being turned, it is determined that reduction of the effective radius of one of the wheels is caused by a change of the tire pneumatic pressure or the like. Then, the torque to be applied to the electric drive motor for the wheel with the high number of revolutions is corrected so as to be decreased. Accordingly, it is possible to suppress an undesirable generation of the turning force caused by the difference between the respective effective radii of the left and right drive wheels.

Where the drive command output section is operable to perform the torque control of the electric drive motor referred to above, the stipulated rule followed by the correcting section may have a content which is such that when the steering angle detected by the steering angle detector indicates a turning condition, the radius of turn of the electrically powered vehicle and the respective theoretical numbers of revolutions of the left and right drive wheels and the rotation ratios of those numbers of revolutions (i.e., the left number of revolutions/the right number of revolutions) are determined from the steering angle. If the detected number of revolutions of the drive wheel is greater than the theoretical number of revolutions of the drive wheel on the same side, the command value to be outputted to the drive circuit of one of the electric drive motors, which exhibits higher rotational speed than that of the other drive wheel, is corrected by calculating the drive current of such one of the electric drive motors, so as to establish the following equation;

(Number of Revolutions of Left Drive Wheel)×(Drive Current for Left Drive Wheel)=(Ratio of Numbers of Revolutions)×(Number of Revolutions of Right Drive Wheel)×(Drive Current for Right Drive Wheel)

When the steering wheel is turned, indicating the turning condition, the theoretical numbers of revolutions of those drive wheels and the radius of turn of the electrically powered vehicle are calculated from the steering angle. Then, the ratios between the detected numbers of revolutions of the drive wheels and the respective theoretical numbers of revolutions are determined.

By regarding one of the drive wheels, whose determined rotational ratio exhibits a greater value than that of the other drive wheel, as accompanying a reduction in effective radius and by correcting so as to reduce the torque, a neutral steer condition is maintained. Accordingly, it is possible to suppress an undesirable generation of the turning force caused by the difference between the respective effective radii of the left and right drive wheels resulting from a change in tire pneumatic pressure.

Where the drive command output section is operable to perform the rotational number control of the electric drive motor referred to above, the stipulated rule followed by the correcting section may have a content which is such that when the steering angle detected by the steering angle detector is zero, and in the event that one of the drive wheels is driven under braking operation, the torque applied to the electric drive motor for the drive wheel driven under braking operation is released so that the commanded number of revolutions, which is the drive command value outputted from the drive command output section, is corrected to the number of revolutions detected by the rotational number detector during a free revolution, with such one of the drive wheels subsequently re-driven.

If the left and right electric drive motors are operated to rotate at the same number of revolutions, one of the drive wheels, which has a smaller effective radius than that of the other of the drive wheels, is likely to rotate at a high speed as led by the other of the drive wheels, which then has the larger effective radius, and, therefore, the drive command output section controls the number of revolutions so as to be suppressed, wherefore the turning force comes to be generated.

In the event that when the steering wheel is not turned, indicating a straight forward traveling condition, the drive wheel is driven under braking operation, the torque applied to the electric drive motor for the drive wheel driven under braking operation is released so that the commanded number of revolutions is corrected to the number of revolutions detected as a result of such free revolution, with such one of the drive wheels subsequently re-driven. Accordingly, it is possible to suppress the generation of the turning force, which would result from the presence of a difference in effective radius between those drive wheels.

Where the drive command output section is operable to perform the rotational number control of the electric drive motor referred to above, the stipulated rule followed by the correcting section may have a content which is such that when the steering angle detected by the steering angle detector indicates the turning condition, and in the event that one of the drive wheels is driven under braking operation, the torque applied to the electric drive motor for the drive wheel driven under braking operation is released to allow it to undergo a free revolution so that the number of revolutions detected by the rotational number detector during the free revolution is outputted as the corrected command value, with such one of the drive wheels subsequently re-driven.

In the event that the steering wheel is turned, indicating the turning condition, the theoretical numbers of revolutions and the radius of turn of the electrically powered vehicle are calculated from the steering angle. Then, the drive wheels are so controlled in their numbers of revolutions so as to attain such calculated numbers of revolutions, respectively. When at this time one of the drive wheels is driven under the braking operation, the torque applied to the electric drive motor for the drive wheel driven under braking operation is released so that the number of revolutions detected as a result of such free revolution is applied as the commanded number of revolutions, which will become the corrected command value, with such one of the drive wheels subsequently re-driven. Accordingly, the neutral steer condition is maintained and it is possible to suppress an undesirable generation of the turning force in the electrically powered vehicle as a result of the difference in effective radius of the drive wheel.

In any one of the foregoing preferred embodiments of the present invention, the stipulated rule followed by the correcting section may have a content which is such that an average value of the ratios between the effective radii of the drive wheel, which were obtained from a number of correcting controls, is stored and from this average value the corrected command value is roughly corrected. The utilization of the average value as discussed above is effective to perform a further stabilized control.

The present invention in accordance with another aspect thereof provides a method of controlling an electrically powered vehicle including a plurality of drive wheels capable of respectively performing left and right drives, which are independent from each other, and electric drive motors for driving those drive wheels. In the method, a command value is so corrected by a correcting section for correcting the command value of an electric current value or a number of revolutions inputted from a drive command output section, which is capable of outputting a command value in accordance with an amount of actuation of an accelerator pedal, the corrected command value being to be outputted to a drive circuit for the electric drive motor for each of the drive wheel, that using various detection values representative of the number of revolutions per unitary time of each of the drive wheels and the electric drive motor current, which is a drive current applied to the electric drive motor for each of the drive wheels, and also using a steering angle as measured with respect to a traveling direction, in accordance with a rule stipulated so that the relation between corrected command values to be outputted to the respective drive circuits for the left and right drive wheels is such that rather than the relation between the command values before being corrected, a turning force induced in the electrically powered vehicle because of the difference in effective radius of the drive wheels can be suppressed.

According to the second mentioned aspect of the present invention, in a manner similar to that described in connection with the control device for the electrically powered vehicle, which is designed in accordance with the first mentioned aspect of the present invention, since using the steering angle as measured with respect to the traveling direction, the number of revolutions of the left or right wheels or the electric current value is corrected, the difference in driving force between the left and right drive wheels can be zeroed to thereby suppress the generation of the turning force and, therefore, the traveling stability can be increased advantageously.

In one preferred embodiment of the control method referred to above, and particularly where the drive command output section is operable to perform the torque control of the electric drive motor, the stipulated rule followed by the correcting section may have a rule which is such that the command value to be outputted to the drive circuit of each of the electric drive motors for the left and right drive wheels is corrected to establish the following equation when the steering angle detected by the steering angle detector is zero:

(Number of Revolutions of Left Drive Wheel)×(Drive Current for Left Drive Wheel)=(Number of Revolutions of Right Drive Wheel)×(Drive Current for Right Drive Wheel)

In the case of this method, in a manner similar to that described in connection with the control device for the electrically powered vehicle, which is designed in accordance with the first mentioned aspect of the present invention, in the event that the difference in number of revolutions between the left and right wheels is observed, reduction of the effective radius brought about by, for example, a change in tire pneumatic pressure is determined and correction is made to reduce the torque of to the electric drive motor with the high number of revolutions is corrected and, accordingly, the generation of the turning force can be advantageously suppressed.

In one preferred embodiment of the control method referred to above, and particularly where the drive command output section is operable to perform the torque control of the electric drive motor, the stipulated rule followed by the correcting section may have a rule which is such that when the steering angle detected by the steering angle detector indicates a turning condition, the radius of turn of the electrically powered vehicle and the respective theoretical numbers of revolutions of the left and right drive wheels and the rotation ratios of those numbers of revolutions (i.e., the left number of revolutions/the right number of revolutions) are determined from the steering angle. If the detected number of revolutions of the drive wheel is greater than the theoretical number of revolutions of the drive wheel on the same side, the command value to be outputted to the drive circuit of one of the electric drive motors, which exhibits higher rotational speed than that of the other drive wheel, is corrected by calculating the drive current of such one of the electric drive motors, so as to establish the following equation;

(Number of Revolutions of Left Drive Wheel)×(Drive Current for Left Drive Wheel)=(Ratio of Numbers of Revolutions)×(Number of Revolutions of Right Drive Wheel)×(Drive Current for Right Drive Wheel)

In such case, in a manner similar to that described in connection with the first mentioned aspect of the present invention that provides the control device of the type, in which the torque control is performed, one of the drive wheels, whose rotation ratio between the detected numbers of revolutions of the drive wheel and the theoretical number of revolutions is greater than that of the other drive wheel is regarded as having a reduction in effective radius and correction is therefore made to reduce the torque and, accordingly, the neutral steer condition can be maintained and the generation of the turning force resulting from the presence of the difference in effective radius between the left and right drive wheels can be suppressed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
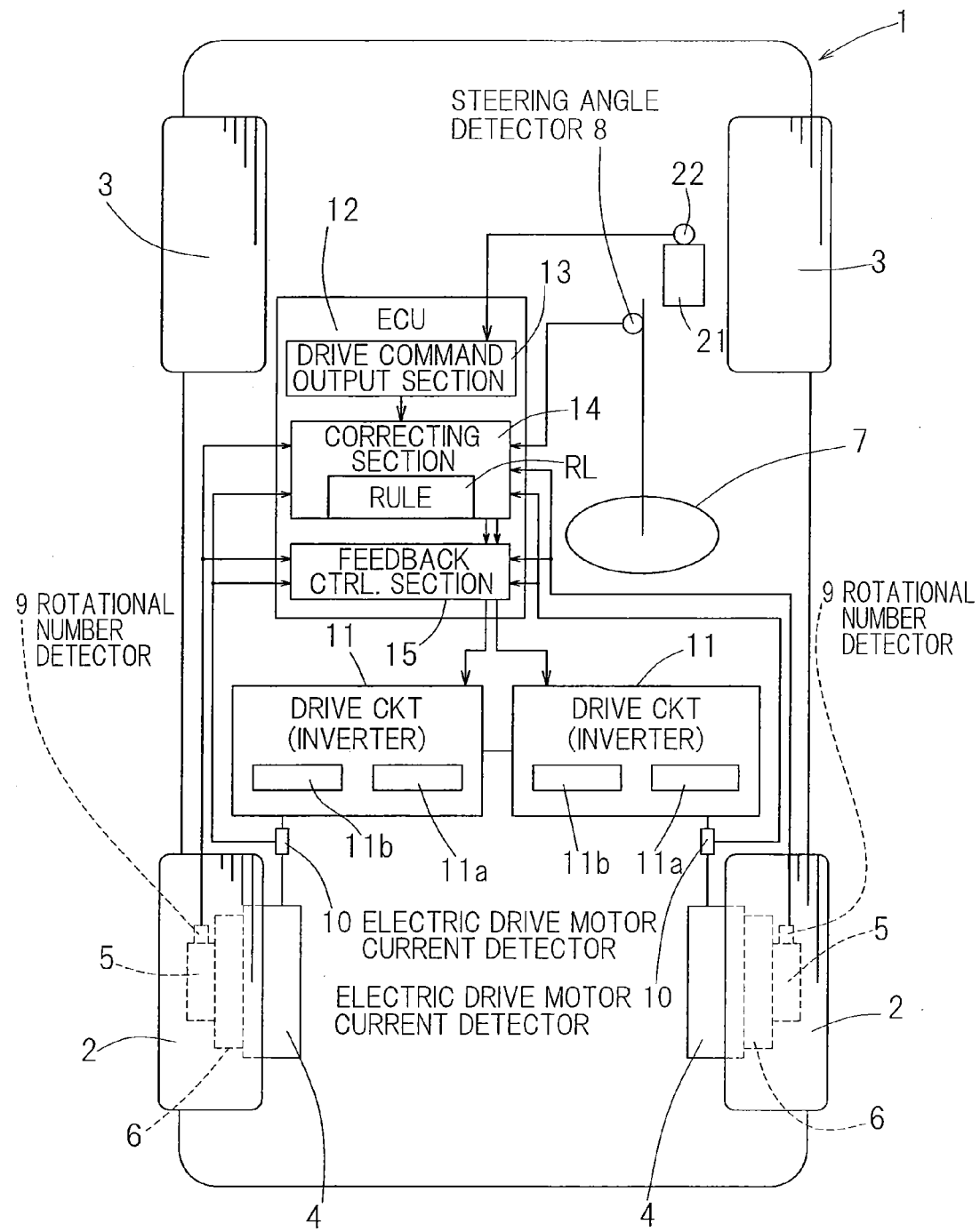
FIG. 1 is an explanatory diagram showing a conceptual construction illustrative of a control device for an electrically powered vehicle and a control method therefor, both designed in accordance with a preferred embodiments of the present invention.

A preferred embodiment of the present invention will now be described in detail with reference to the accompanying drawings. FIG. 1 illustrates a conceptual construction of an electrically powered vehicle equipped with a control device for the electrically powered vehicle designed in accordance with the preferred embodiment of the present invention. The electrically powered vehicle, hereinafter referred to as a vehicle 1, is a four wheeled automotive vehicle including left and right rear wheels, which are rendered to be vehicle drive wheels 2, and left and right front wheels, which are rendered to be vehicle driven and steering wheels 3. Each of those drive and driven wheels 2, 3 is a wheel having a corresponding tire (not shown). The left and right drive wheels 2 and 2 are driven by respective electric drive motors 4 and 4 that are separate and independent from each other. Each of those drive wheels 2 is supported by a vehicle body structure of the vehicle 1 through respective wheel support bearing assemblies 5. Each of the electric drive motors 4 is an in-wheel motor having a part thereof or the whole thereof incorporated within the associated drive wheel 2 and being operable to transmit a rotation to the associated drive wheel 2 through a reduction gear unit 6. Those electric drive motors 4, reduction gear units 6 and wheel support bearing assemblies 5 altogether form respective in-wheel motor units. It is, however, to be noted that each of the electric drive motors 4 may be of a type capable of rotationally drive the associated drive wheel 2 directly and without any reduction gear unit 6.

Each of the electric drive motors 4 is in the form of, for example, a synchronous motor and is controlled by a drive circuit 11 including an inverter. The drive circuit 11 employed for each of the left and right drive wheels 2 and 2 includes a power circuit unit 11a, which utilizes a direct current of a battery (not shown) as an electric power source to output an electric drive current of each phase of the associated electric drive motor 4, and a control unit 11b for outputting of an electric voltage waveform or the like of each phase, that will becomes an alternating current of the power circuit unit 11a, in dependence on an inputted command value, to thereby control the power circuit unit 11a. The command value so inputted to the control unit 11b and referred to above is represented by the torque value or the number of revolutions (i.e., the number of revolutions per unitary time).

The vehicle 1 is provided with various sensors such as, for example, a steering angle detector 8 for detecting the angle of a steering wheel 7, an actuation amount detector 22 for detecting the amount of actuation of an accelerator pedal, rotational number detectors 9 for detecting the numbers of revolutions per unitary time of the respective drive wheels 2, and electric drive motor current detectors 10 for detecting respective electric motor currents, each of which is the drive current applied to the electric motor 4 for each of the drive wheels 2. It is, however, to be noted that in addition to the use of those detectors referred to above, the use may be additionally made of rotational number detectors (not shown) for detecting the respective numbers of revolutions of the respective driven wheels 3 and load detectors (also not shown) for detecting respective loads acting on the vehicle wheels 2 and 3.

The vehicle 1 is also provided with an electric control unit (ECU) 12 for controlling the vehicle in its entirety, and this electric control unit 12 is in turn provided with a drive command output section 13 for outputting a command value to each of the electric drive motors 4 for the respective drive wheels 2, a correcting section 14 and a feedback control section 15. The drive command output section 13 has as a basic function, a function of outputting the command value, which is dependent on the amount of actuation of the accelerator pedal to each of the drive circuits 11 for the respective drive wheels 2, and may be of a type capable of outputting the command value, which has been corrected on the basis of respective detection values of the various detectors provided in the vehicle 1. The drive command output section 13 may be of a type capable of performing either a torque control or a rotational number control. This drive command output section 13 outputs a torque value as the command value, if it is of the type capable of performing the torque control, but the number of revolutions if it is of the type capable of performing the rotational number control.

The feedback control section 15 referred to above is a means for performing a feedback control to the command value which has been corrected by the correcting section 14. This feedback control section 15, where the torque control is performed, performs a feedback control on the command value of the electric drive motor current to be outputted in dependent on the torque value obtained from an electric drive motor current value detected by the electric drive motor current detector 10. On the other hand, the feedback control section 15, where the rotational number control is performed, performs a feedback control on the command value of the number of revolutions to be outputted in dependent on the number of revolutions detected by the rotational number detector 9.

The correcting section 14 referred to above is a means for performing, among various corrections performed in the electric control unit 12, a correction in the event that the respective effective radii of the left and right drive wheels 2 and 2 differ from each other as a result of a change in tire pneumatic pressure or the like. The correcting section 14 performs the correction of the command value, which is to be outputted from the electric control unit 12 to each of the drive circuit 11, in accordance with a predetermined rule RL. This correcting section 14 is adapted to be inputted with, in addition to the command value referred to above, pieces of information necessary for the correction including a steering angle detected by the steering angle detector 8, the number of revolutions (the number of revolutions per unitary time) detected by each of the rotational number detectors 9 for the respective drive wheels 2, and electric motor currents detected by the electric drive motor current detectors 10 for the respective electric motors 4 in the drive wheels 2.

The rule RL of the correcting section 14 referred to above is a rule used to correct the command value by using the detected steering angle as measured with respect to a traveling direction and is stipulated so that the relation between the corrected command values to be outputted to the respective drive circuits 11 for the respective left and right drive wheels 2, with respect to the detected number of revolutions of each of the drive wheels 2 and the inputted electric drive motor current will be such that rather than the relation between the command values before being corrected, the turning force induced in the vehicle 1 due to the difference in effective radius of the drive wheels 2 can be suppressed.

Specifically, the rule RL of the correcting section 14 differs depending on whether the drive command output section 13 performs the torque control or whether it performs the rotational number control. In the first place, the case applicable where the drive command output section 13 performs the torque control will be described. In this case, the rule RL has the following contents to perform either one of the following procedures (1) and (2).

(1) When the inputted steering angle is zero:

The command value to be outputted to the drive circuit 11 of each of the electric drive motors 4 for the left and right drive wheels 2 is so corrected as to establish the following equation:

(Number of Revolutions of Left Drive Wheel)×(Drive Current for Left Drive Wheel)=(Number of Revolutions of Right Drive Wheel)×(Drive Current for Right Drive Wheel)

(2) When the detected steering angle indicates the turning condition, the radius of turn R of the vehicle 1 and the respective theoretical numbers of revolutions of the left and right drive wheels 2 and 2 and the rotation ratios of those theoretical numbers of revolutions (i.e., the left number of revolutions/the right number of revolutions) are determined from the detected steering angle. If the detected number of revolutions of the drive wheel 2 is greater than the theoretical number of revolutions of the drive wheel on the same side, the command value to be outputted to the drive circuit 11 of one of the electric drive motors 4, which exhibits higher rotational speed than that of the other drive wheel 2, is corrected by calculating the drive current of such one of the electric drive motor 4, so as to enable the latter to assume the following equation;

(Number of Revolutions of Left Drive Wheel)×(Drive Current of Left Drive Wheel)=(Ratio of Numbers of Revolutions)×(Number of Revolutions of Right Drive Wheel)×(Drive Current of Right Drive Wheel)

Figure 2:
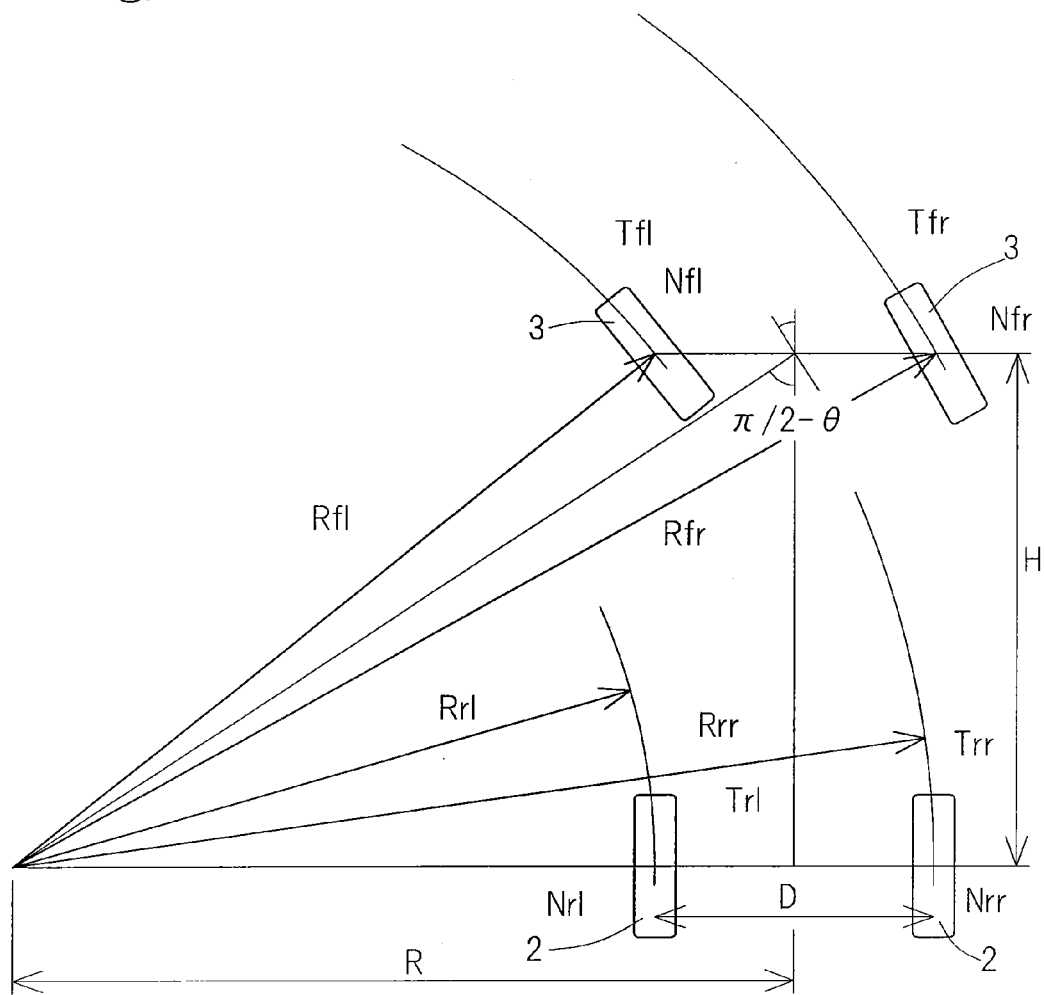
FIG. 2 is an explanatory diagram showing the relationship between the number of revolutions of each of vehicle drive wheels, driving torques and radii of turn, which are exhibited during the cornering of the electrically powered vehicle.

With particular reference to FIG. 2, the relation between the number of revolutions of each of the wheels, the drive torque applied to each of the wheels and the radius of turn of each of the wheels will now be described. Assuming that the following nomenclatures are expressed by the following symbols;

R: Radius of turn of the vehicle
D: Tread
H: Wheel base
Nfl: Number of revolutions of the front left wheel
Nfr: Number of revolutions of the front right wheel
Nrl: Number of revolutions of the rear left wheel
Nrr: Number of revolutions of the rear right wheel
Trl: Drive torque of the rear left wheel
Trr: Drive torque of the rear right wheel
Rfl: Radius of turn of the front left wheel
Rfr: Radius of turn of the front right wheel
Rrl: Radius of turn of the rear left wheel
Rrr: Radius of turn of the rear right wheel the following equations (I) and (II) establish:

$$Nfl/Rfl=Nfr/Rfr=Nrl/Rrl=Nrr/Rrr \quad (I)$$

$$Trl=Trr \quad (II)$$

The number of revolutions Nrl of the rear left wheel and the number of revolutions Nrr of the rear right wheel, both in the equation (I) represent the respective theoretical numbers of revolutions of the left and right drive wheels 2 and 2.

The operation of the control device so configured as hereinabove described will now be described. In the case of the torque control type drive wheel, the operation takes place in the following manner.

In the event that the left and right drive wheels 2 and 2 are caused to generate respective torques that are equal to each other, one of the drive wheels 2 and 2, which has the smaller radius than that of the other drive wheel, will transmit a relatively large driving force to the ground surface, resulting in generation of the turning force. In such drive wheel 2 having the small radius, because of the relatively small effective radius, the number of revolutions of the wheel even during the straight forward travel of the vehicle tends to become larger than that exhibited by the other wheel.

In view of the above, when the vehicle 1 is traveling straight forwards with the steering wheel 7 having been not turned, but accompanying a difference in number of revolutions of the left and right drive wheels 2 and 2, the correcting section 14 determines a reduction of the effective radius of one of the wheels as a result of, for example, a change in tire pneumatic pressure of the wheel and then corrects the drive motor torque, which is on the wheel of the higher number of revolutions, so as to reduce such drive motor torque. Accordingly, it is possible to suppress a generation of the turning force resulting from the difference between the respective effective radii of the left and right drive wheels 2 and 2 caused by, for example, the change in tire pneumatic pressure of the wheel.

Also, when the vehicle 1 is curving with the steering wheel 7 thereof having been turned, the radius of turn R of the vehicle 1 and the theoretical numbers of revolutions of each of the drive wheels 2 and 2 are calculated from the steering angle and the rotation ratios of the detected numbers of revolutions of the drive wheels to the respective theoretical numbers are determined. One of the drive wheels, whose determined rotational ratio exhibits a greater value than that of the other drive wheel, is regarded as accompanying a reduction in effective radius and the correction is made so as to reduce the torque on the wheel to thereby maintain a neutral steer condition. Accordingly, it is possible to suppress a generation of the turning force resulting from the difference between the respective effective radii of the left and right drive wheel 2 and 2 that is caused by, for example, the change in tire pneumatic pressure of the wheel.

The contents of the rule RL utilized by the correcting section 14 as hereinabove described, which is applicable where the drive command output section 12 performs the rotational number control, will be described hereinafter. In such case, the rule RL has the following contents to perform either one of the following procedures (3) and (4).

(3) When the detected steering angle is zero, and in the event that one of the drive wheels 2 is driven under braking operation, the torque applied to the electric drive motor for the drive wheel 2 driven under braking operation is released so that the commanded number of revolutions, which is the drive command value outputted from the drive command output section 13, is corrected to the number of revolutions detected by the rotational number detector 9 during a free revolution, with such one of the drive wheels subsequently re-driven.

(4) When the steering angle detected by the steering angle detector indicates the turning condition, and in the event that one of the drive wheels 2 is driven under braking operation, the torque applied to the electric drive motor for the drive wheel 2 driven under braking operation is released to allow it to undergo a free revolution so that the number of revolutions detected by the rotational number detector 9 during the free revolution can be applied as a commanded number of revolutions, which will become the command value after the correction, with such one of the drive wheels subsequently re-driven.

In the case of the rotational number control type drive wheel, the following operation takes place:

If the electric drive motors 4 and 4 for the respective left and right drive wheels 2 and 2 are driven at the same number of revolutions, one of the drive wheels 2, which has a smaller effective radius than that of the other of the drive wheels, is likely to rotate at a high speed as led by the other of the drive wheels 2, which then has the larger effective radius, and, therefore, the drive command output section 13 controls the number of revolutions so as to be suppressed, wherefore the turning force comes to be generated.

In the event that the drive wheel 2 is driven under braking operation while the vehicle is traveling straight forwards with the steering wheel 7 not yet turned, the torque applied to the electric drive motor 4 for the drive wheel 2 driven under braking operation, is released and the commanded number of revolutions is corrected to the number of revolutions detected during the free revolution, with such drive wheel subsequently re-driven. Since the condition of free revolution is a condition, in which neither the driving force nor the braking force is generated, the number of revolutions detected during the free revolution is rendered to be the commanded number of revolutions after correction if the vehicle is traveling along a target excursion. With this number of revolutions, no turning force is generated in the vehicle. Accordingly, it is possible to suppress the generation of the turning force, which would result from the presence of a difference in effective radius between those drive wheels.

If the steering wheel 7 is turned, indicating the turning condition, the radius of turn R of the vehicle 1 and the theoretical numbers of revolutions of the drive wheels 2 are calculated from the steering angle and the numbers of revolutions of the drive wheels 2 are controlled so as to attain the theoretical numbers of revolutions.

In the event that at that time the drive wheel 2 is driven under braking operation, the torque applied to the electric drive motor 4 for that drive wheel 2 is released and, the commanded number of revolutions is corrected to the number of revolutions detected during a free revolution, with the drive wheel subsequently re-driven, to thereby maintain a neutral steer condition. Accordingly, it is possible to suppress the generation of the turning force in the vehicle as a result of the difference in effective radius between the drive wheels.

It is to be noted that in the practice of the foregoing embodiment of the present invention, in the case where either the torque control type drive wheels or the rotational number control type drive wheels are employed, the correcting section 14 referred to above may have the rule RL of a kind having such rule contents that based on the correction control performed a number of times by the correcting section 14, the average value of the ratios between the effective radii of the drive wheels 2 can be stored, that is, the average value of those ratios between the effective radii, exhibited when calculated by means of the correction control performed a number of times, is stored and from this average value, the command value is roughly corrected. If the average value discussed above is used, the control can be performed further stably.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Vehicle (Electrically powered vehicle)
2 . . . Drive wheel
3 . . . Driven wheel
4 . . . Electric Drive Motor
7 . . . Steering wheel
8 . . . Steering angle detector
9 . . . Rotational number detector
10 . . . Electric drive motor current detector
11 . . . Drive circuit
12 . . . Electric control unit
13 . . . Drive command output section
14 . . . Correcting section
21 . . . detector
22 . . . Accelerator pedal
RL . . . Rule

What is claimed is:

1. A control device for controlling an electrically powered vehicle including a plurality of drive wheels capable of respectively performing left and right drives, which are independent from each other, and electric drive motors for driving the respective drive wheels, which device comprises:

a steering angle detector for detecting the steering angle, which is the angle of turn of a steering wheel;

a rotational number detector for detecting the number of revolutions per unitary time of each of the drive wheels;

an electric drive motor current detector for detecting an electric drive motor current, which is a drive current applied to the electric drive motor for each of the drive wheels;

a drive circuit for the electric drive motor for each of the drive wheels;

a drive command output section capable of outputting a command value of an electric current in accordance with an amount of actuation of an accelerator pedal; and a correcting section for correcting the command value of the electric current that is inputted from the drive command output section so that the corrected command value is outputted to the drive circuit for the electric drive motor for each of the drive wheels;

wherein the correcting section makes use of the steering angle detected by the steering angle detector as a traveling direction and is operable to correct the command value so that the relation between the numbers of revolutions per unitary time of the respective left and right drive wheels detected by the rotational number detector and the electric drive motor currents applied to the electric drive motors for the respective left and right drive wheels detected by the electric drive motor current detector is such that a turning force induced in the electrically powered vehicle because of the difference in effective radius of the drive wheels can be suppressed.

2. The control device as claimed in claim 1, wherein the correcting section corrects the command value to be outputted to the drive circuit of each of the electric drive motors for the left and right drive wheels to establish the following equation if the steering angle detected by the steering angle detector is zero:

(Number of Revolutions of Left Drive Wheel)×(Drive Current for Left Drive Wheel)=(Number of Revolutions of Right Drive Wheel)×(Drive Current for Right Drive Wheel).

3. The control device as claimed in claim 1, wherein the correcting section determines if the steering angle detected by the steering angle detector is not equal to zero, the radius of turn of the electrically powered vehicle and the respective theoretical numbers of revolutions of the left and right drive wheels and the rotation ratio of those numbers of revolutions from the steering angle and, if the detected number of revolutions of the drive wheel is greater than the theoretical number of revolutions of the drive wheel on the same side, corrects the command value to be outputted to the drive circuit of one of the electric drive motors, which exhibits higher rotational speed than that of the other drive wheel by calculating the drive current of such one of the electric drive motors, so as to establish the following equation:

(Number of Revolutions of Left Drive Wheel)×(Drive Current for Left Drive Wheel)=(Ratio of Numbers of Revolutions)×(Number of Revolutions of Right Drive Wheel)×(Drive Current for Right Drive Wheel).

4. A control device for controlling an electrically powered vehicle including a plurality of drive wheels capable of respectively performing left and right drives, which are independent from each other, and electric drive motors for driving the respective drive wheels, which device comprises:
 a steering angle detector for detecting the steering angle, which is the angle of turn of a steering wheel;
 a rotational number detector for detecting the number of revolutions per unitary time of each of the drive wheels;
 a drive circuit for the electric drive motor for each of the drive wheels;
 a drive command output section capable of outputting a command value of the number of revolutions per unitary time in accordance with an amount of actuation of an accelerator pedal; and
 a correcting section for correcting the command value of the number of revolutions that is inputted from the drive command output section so that the corrected command value is outputted to the drive circuit for the electric drive motor for each of the drive wheels,
 wherein in the event that one of the drive wheels is led by the other of the drive wheels a torque applied to the electric drive motor for the one of the drive wheels is temporarily released, so that the rotational number detector detects the number of revolutions per unitary time of such drive wheel during a free revolution, and
 wherein the correcting section makes use of the steering angle detected by the steering angle detector as a traveling direction, and corrects the command value to the number of revolutions per unitary time detected by the rotational number detector during a free revolution.

5. A method of controlling an electrically powered vehicle including a plurality of drive wheels capable of respectively performing left and right drives, which are independent from each other, and electric drive motors for driving those drive wheels, the method comprising:
 detecting a steering angle, which is an angle of turn of a steering wheel;
 detecting a number of revolutions per unitary time of each of the drive wheels;
 detecting an electric drive motor current, which is a drive current applied to the electric drive motor for each of the drive wheels;
 providing a command value of an electric current value in accordance with an amount of actuation of an accelerator pedal;
 wherein the providing the command value includes correcting the command value, with using the detected steering angle as a traveling direction,
 so that the relation between the detected numbers of revolutions per unitary time of the respective left and right drive wheels and the detected electric drive motor currents applied to the electric drive motors for the respective left and right drive wheels is such that a turning force induced in the electrically powered vehicle because of the difference in effective radius of the drive wheels can be suppressed.

6. The method as claimed in claim 5, wherein the providing the command value includes correcting the command value to be outputted to the drive circuit of each of the electric drive motors for the left and right drive wheels to establish the following equation if the detected steering angle is zero:

(Number of Revolutions of Left Drive Wheel)×(Drive Current for Left Drive Wheel)=(Number of Revolutions of Right Drive Wheel)×(Drive Current for Right Drive Wheel).

7. The method as claimed in claim 5, wherein the providing the command value includes determining if the detected steering angle is not equal to zero, the radius of turn of the electrically powered vehicle and the respective theoretical numbers of revolutions of the left and right drive wheels and the rotation ratio of those numbers of revolutions from the steering angle and, if the detected number of revolutions of the drive wheel is greater than the theoretical number of revolutions of the drive wheel on the same side, correcting the command value to be outputted to the drive circuit of one of the electric drive motors, which exhibits higher rotational speed than that of the other drive wheel by calculating the drive current of such one of the electric drive motors, which establishes the following equation:

(Number of Revolutions of Left Drive Wheel)×(Drive Current for Left Drive Wheel)=(Ratio of Numbers of Revolutions)×(Number of Revolutions of Right Drive Wheel)×(Drive Current for Right Drive Wheel).

\* \* \* \* \*